United States Patent
Heinzelman et al.

(10) Patent No.: US 6,754,277 B1
(45) Date of Patent: Jun. 22, 2004

(54) ERROR PROTECTION FOR COMPRESSED VIDEO

(75) Inventors: Wendi B. Heinzelman, Cambridge, MA (US); Rajendra K. Talluri, Plano, TX (US); Madhukar Budagavi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/413,436

(22) Filed: Oct. 6, 1999

Related U.S. Application Data (60) Provisional application No. 60/103,451, filed on Oct. 6, 1998.

(51) Int. Cl.[7] .............................. H04B 1/66; H04N 7/12
(52) U.S. Cl. ................................................ 375/240.27
(58) Field of Search .......................... 375/240, 240.01, 375/240.02, 240.3, 240.4, 240.15, 240.16, 240.17, 240.18, 240.26, 240.27; 348/284.1, 390.1, 400.1, 405.1, 409.1, 415.1, 416.1, 417.1, 699, 700, 845, 845.1, 845.2, 845.3; 382/232–240, 251, 248; H04N 7/12; H04B 1/66

(56) References Cited

U.S. PATENT DOCUMENTS

| | | | | |
|---|---|---|---|---|
| 5,604,539 A | * | 2/1997 | Ogasawara et al. | 348/396 |
| 5,850,482 A | * | 12/1998 | Meaney et al. | 382/232 |
| 6,035,069 A | * | 3/2000 | Nagai et al. | 382/233 |
| 6,104,757 A | * | 8/2000 | Rhee | 375/240 |
| 6,111,916 A | * | 8/2000 | Talluri et al. | 375/240 |
| 6,122,014 A | * | 9/2000 | Panusopone et al. | 348/592 |
| 6,229,854 B1 | * | 5/2001 | Kikuchi et al. | 375/240.27 |
| 6,304,607 B1 | * | 10/2001 | Talluri et al. | 375/240.27 |
| 6,310,897 B1 | * | 10/2001 | Watanabe et al. | 370/522 |
| 6,415,398 B1 | * | 7/2002 | Kikuchi et al. | 714/701 |
| 6,587,590 B1 | * | 7/2003 | Pan | 382/250 |
| 6,594,790 B1 | * | 7/2003 | Sato et al. | 714/746 |

* cited by examiner

*Primary Examiner*—Tung T. Vo
(74) *Attorney, Agent, or Firm*—Carlton H. Hoel; W. James Brady; Frederick J. Telecky, Jr.

(57) ABSTRACT

Provides error protection coding for video data which has been partitioned into motion data and texture data with error protection for the motion data greater than the error protection for the texture data.

8 Claims, 5 Drawing Sheets

ERROR PROTECTION FOR COMPRESSED VIDEO

CROSS-REFERENCE TO RELATED APPLICATIONS

The present application claims priority from provisional patent application serial No: 60/103,451 filed Oct. 6, 1998.

BACKGROUND OF THE INVENTION

As technology has advanced in the areas of cellular communications and networks, low power devices, and multimedia standards, a range of new applications have been developed. As these technologies continue to mature, the applications from these different areas will come together, and what will eventually emerge is a portable multimedia terminal. This is a low-power, portable device that is capable of both transmitting and receiving voice, video, and data through the wireless network. Multimedia data requires a large amount of bandwidth, so these multimedia terminals will need to use the next generation cellular systems which can provide the necessary bandwidth to each terminal. These terminals will also need to be light-weight for portability, which requires a minimization of battery size and hence the use of state-of-the-art low power design techniques. Finally, it is important that these terminals use standardized compression and communication methods in order to facilitate interoperability among different devices. These multimedia terminals will open up many new applications, such as video cellular phones and wireless web browsing. However, there are problems that need to be addressed before transmission of multimedia data over wireless networks can become commonplace.

Mobile multimedia terminals must be able to transmit video over the low-bandwidth, error-prone wireless networks such that the decoder obtains high quality reconstructed video. Video data has a very high data rate and thus needs to be compressed before it can be transmitted across the bandwidth-constrained wireless channel. Video is typically compressed using international standard compression methods, such as the MPEG or H.263 standards. These standard video compression methods use predictive coding (motion compensation) of the frames and variable length codewords to obtain a large amount of compression. This makes the compressed video bitstream sensitive to channel errors, as predictive coding causes errors in the reconstructed video to propagate in time to future frames of video, and the variable-length codewords cause the decoder to easily lose synchronization with the encoder in the presence of bit errors. Once synchronization is lost, the decoder may not be able to correctly decode the remainder of the bitstream, even if no further bits are in error.

The MPEG4 video compression standard incorporated several error resilience tools into the standard to make the compressed bitstream more robust to channel errors. These tools include resynchronization markers, header extension codes, data partitioning, and reversible variable length coding. While these are powerful techniques for combating bit errors when they occur at bit error rates (BER) less than $10^{-3}$, typical wireless channels can have much higher bit error rates. Channel coding can be used to further protect the bitstream in such harsh channel conditions but lowers the data throughput. Thus problems of efficient channel coding exist for MPEG4 and related compression methods in high error rate channels.

Hagenauer, Rate-Compatible Punctured Convolutional Codes (RCPC Codes) and their Applications, 36 IEEE Tr.Comm. 389 (1988), discloses punctured convolutional codes as channel codes with the property that different rate codes are compatilble and can thus easily apply unequal error protection for different parts of an information sequence or block.

SUMMARY OF THE INVENTION

The present invention recognizes the advantages of and provides unequal error protection channel coding for compressed video with data partitioning by using higher error protection for packet header information and motion data than for texture data. Further, the header (and bit stuffing) information may have higher error protection than the motion data, so three levels of error protection can exist in each data packet (highest for header and bit stuffing, next highest for motion data, and lowest for texture data). Simillarly, shape data may have a higher error protection than the texture data and at least as high as the motion vector data but less than or equal to header and bit stuffing information.

This has advantages including more efficient channel coding.

DESCRIPTION OF THE PREFERRED EMBODIMENTS

Figure 1:
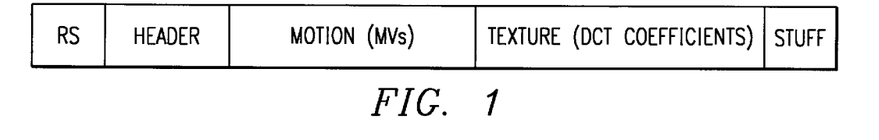
FIG. 1 illustrates a video packet.

The output of an MPEG-4 simple video encoder is a bitstream that contains video packets. If the data partitioning mode is activated, these video packets begin with a header, which is followed by the motion information, the texture information (DCT coefficients), and lastly stuffing bits (see FIG. 1). For simplicity, shape data has been omitted. The header of each packet begins with a resynchronization marker (RS), which is followed by important information needed to decode the data bits in the packet. This is the most important information in the packet, since the whole packet will be dropped if the header is received in error. The motion information has the next level of importance, as motion-compensation cannot be performed without it (and shape data would be comparable). The texture information is the least important of the four segments of the video packet. If texture information is lost, motion-compensated concealment can still be performed without too much degradation of the reconstructed picture. The stuffing information at the end of the packet has a high degree of importance because reversible decoding cannot be performed if this information is corrupted. In addition, the following packet may be dropped if the stuffing bits are received in error. Therefore, the stuffing bits have the same priority as the header bits.

The error resilience tools found in an MPEG-4 compressed video bitstream are effective against certain channel conditions. However, wireless channels often present extremely harsh conditions (on the order of $10^{-1}$ to $10^{-3}$ BERs), which render the error resilience tools ineffective. Thus channel coding is needed to correct some of the bit errors and bring the aggregate BER down to a level at which the error resilience tools can be effective and provide acceptable quality reconstructed video at the decoder.

Figure 2:
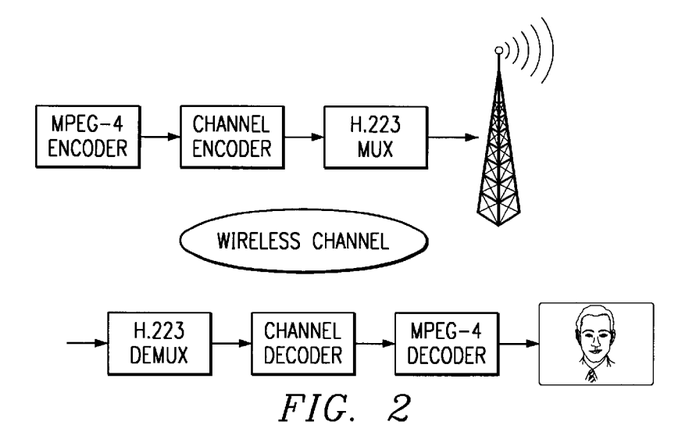
FIG. 2 schematically shows a wireless system.

A complete system for transmission of video across a wireless channel is shown in FIG. 2. This system includes a source coder for video compression, a channel coder for forward error correction (FEC), and an H.223 MUX for packetization and transmission across the network.

Channel coding has long been used to protect data that may get corrupted through transmission or storage. The amount of protection added to the data depends on the bandwidth requirements of the medium being used for transmission or storage and the expected amount of distortion. If too much error protection is added to the data, it is a waste of bandwidth that could be spent on representing the data itself. If too little error protection is added to the data, the corruption might render the data completely unusable. Thus there is a tradeoff between the amount of bandwidth that is allocated to the data and the amount that is allocated to the error protection. When data is compressed, it is very sensitive to errors, since each bit in compressed data contains a large amount of information, so it is especially important to protect highly compressed data.

One method of adding error protection is convolutional encoding of the data. In convolutional encoding, the data is convolved with a number of generator polynomials to produce the FEC coded data. For example, with an nth order polynomial, the current input bit plus a pattern (the nonzero polynomial coefficients) of the previous n bits are added modulo 2 to produce an output bit. The number of polynomials with which the input data is convolved determines the coder rate. Thus, to get a rate-1/2 coder, the input is convolved with the two polynomials, so each input bit yields two output bits. An example of two polynomials is:

$$g_1(X) = X^6 + X^5 + X^3 + X^2 + 1 \quad \text{Eq. 1}$$

$$g_2(X) = X^6 + X^3 + X^2 + X + 1 \quad \text{Eq. 2}$$

The convolution can be implemented with a shift register with taps at the coefficients to be added.

By changing the number of generator polynomials, it is possible to obtain any rate-1/m code that is desired. However, it is often desired to use a rate-k/n code. This is achieved by puncturing the output of a rate-1/m code using a given puncture period and puncture pattern. For example, to obtain a rate-7/10 code from a mother rate-1/2 code, 7 input bits (the puncture period) are convolved with the two generator polynomials in Eq. 1 and 2 to produce 14 output bits. Out of these 14 bits, 4 are thrown away so that only 10 coded bits remain. The puncture pattern dictates which 4 bits are thrown away. There are punctured codes that have good distance properties (i.e., are optimal convolutional codes for a given mother-rate). Using puncturing, it is possible to obtain a large number of codes from a given mother code. Obtaining these different code rates does not require complex changes in hardware structure, so the coding rate can easily be changed often. This could occur in a situation where the coding rate is changed to adapt the channel coder to the channel conditions.

The preferred embodiments change the coding rate for unequal error protection, in which important sections of a bitstream are protected better than the less importation sections. Video that has been coded using the MPEG-4 error resilience tools has this structure which can be exploited by using unequal error protection channel coding.

The video packets created by the source encoder are sent to the channel encoder, where unequal error protection can be applied to the different portions of the video packet. However, the different parts of the video packet (i.e., header, motion, and texture) are variable-length, depending on scene content. Thus, if the video packet were broken into exactly the correct parts, extra overhead would be incurred in sending the lengths of each section of data for each video packet from the encoder to the decoder. Rather than increase the bandwidth in this way, the video packet is broken into the approximate parts of header, motion, and texture data.

Figure 3:
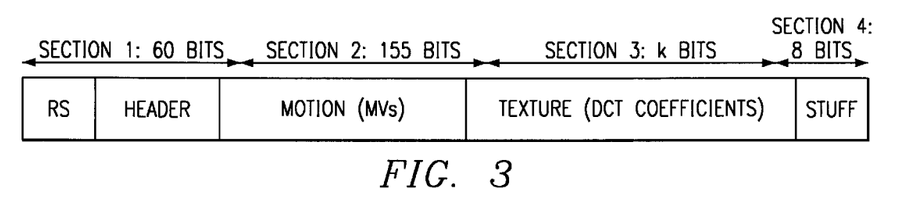
FIGS. 3–4 illustrate preferred embodiment packet partitioning and error protection.

Examination of the lengths of video packets from several coded sequences indicates that the video packet header is less than 60 bits long and the motion part of the packet is typically less than 155 bits long. Thus the first section of bits to be FEC coded with a single rate consists of the first 60 bits of the video packet and includes the resynchronization markers and important header information. Since the header size will never be greater than 60 bits, all the header information is contained in the first section. However, the header will often be less than 60 bits and thus some motion information will be contained in the first section of the FEC packet. The second section consists of the next 155 bits, which mostly represent the motion data. Occasionally some of the motion information will be left out of the second section and other times some of the texture data will be incorporated in the second section, but this number gives a good approximation of the size of the motion part of the video packet. The third section contains all the remaining data except the last byte in the packet. This third section has all or the bulk of the texture data and is variable-length, although it is typically on the order of 500 bits. The final section (number four) contains the last byte (8 bits) of data. This data is important because it contains any stuffing information. If this byte of data gets corrupted, it is not possible to perform reverse decoding and the resynchronization marker of the next packet may not be detected. Therefore, section 4 should be protected with the same level of protection as section 1 (the packet header). This partitioning of the video packet is shown in FIG. 3. Note that only section 3 is variable length. Since the decoder knows the length of the video packet, it can figure out the size of section 3 since the lengths of all the other sections are fixed.

Figure 4:
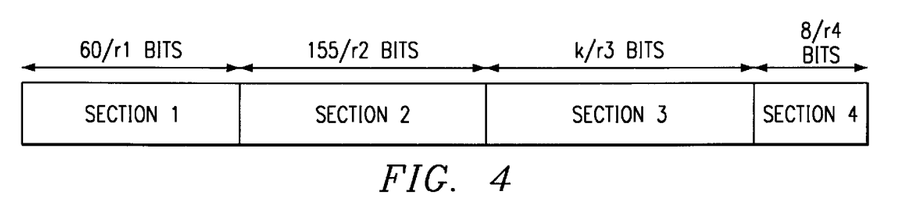

Different rates can be used to code these four sections of the video packet. Section 1 can be coded using a rate-r1 coder, section 2 can be coded using a rate-r2 coder, and so on. Thus the output FEC packet has the structure shown in FIG. 4.

Figure 5:
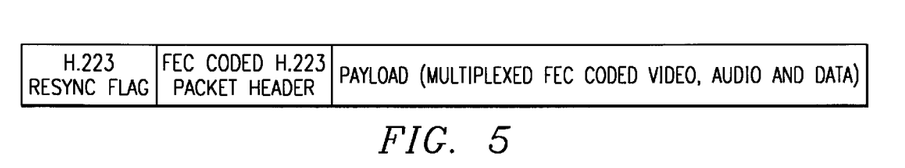
FIG. 5 shows an H.223 packet.

The FEC packets are sent to an H.223 MUX for channel packetization before they can be transmitted over the physical channel. Since the channel coder has already added FEC to the video bitstream, there is no need to use Annex C of H.223 (the error resilient transmission mode). Thus, the channel coder becomes the adaption layer for the H.223 system, and the output of the channel coder (the FEC coded packets) are sent directly to the H.223 multiplex layer. The H.223 multiplex layer adds a resynchronization flag and a header to the FEC packet and performs multiplexing of the video, audio, and data to ease the effects of burst errors. The resynchronization flag is chosen so it has good auto-correlation and low cross-correlation with the data in the payload, and detection of the resynchronization flag is done at the H.223 decoder using correlation and thresholding. If the resynchronization flag is long enough, this will allow a high degree of detection and a low degree of false detection in the presence of channel errors. The header added by the H.223 multiplex layer contains the length of the payload and a code into a multiplex table which tells the decoder how to demultiplex the video, audio, and data. This header is protected using a Golay error correction code. FIG. 5 shows the structure of the H.223 packets.

These packets are sent over a wireless channel, where they are hit with varying degrees of errors. The corrupted packets are received at the decoder, where they are de-multiplexed, channel decoded and source decoded to display or store the reconstructed video.

Experimental Results

To test the preferred embodiment system, several experiments were run to code the sequences "Akiyo", "Mother & Daughter", "Container Ship", and "Hall Monitor" at QCIF resolution. The quantization parameter was chosen so that the source coding output was approximately 24 Kbps at 10 fps, as shown in Table 1. Each reconstructed sequence contained 100 frames, or 10 seconds of video.

TABLE 1

Source coding information.

| Sequence Name | Resolution | Frame Rate (Hz) | Bitrate (Kbps) | QP |
|---|---|---|---|---|
| Akiyo | QCIF | 10 | 24 | 6 |
| Mother & Daughter | QCIF | 10 | 24 | 8 |
| Container Ship | QCIF | 10 | 24 | 9 |
| Hall Monitor | QCIF | 10 | 24 | 9 |

Each sequence was coded using: (1) resynchronization only, (2) data partitioning plus resynchronization, and (3) reversible variable length codes plus data partitioning plus resynchronization. These compressed bitstreams were then channel coded using convolutional encoding with puncturing to achieve the rates shown in Table 2. These rates were chosen because they all give 50% FEC overhead while adding different amounts of protection to the parts of the video packet. Thus the results of the experiments will show where it is best to use a fixed amount of overhead bits when protecting MPEG-4 video.

TABLE 2

Unequal error protection rates.

| Rate (r1) Section 1: Header + | Rate (r2) Section 2: Motion + | Rate (r3) Section 3: Texture + | Rate (r4) Section 4: Stuffing + |
|---|---|---|---|
| ½ | ½ | 1 | ½ |
| ½ | 7/10 | ¾ | ½ |
| ⅗ | 1 | ⅗ | ⅗ |
| ⅗ | ⅗ | ¾ | ⅗ |
| 7/10 | 7/10 | 7/10 | 7/10 |

These coded sequences were sent through a GSM channel simulator. This simulator is based on a complex model of a GSM channel that has been fitted with data taken from a real GSM channel to get an accurate account of the errors found on this channel. The channel is not a binary channel, so bits are sent with a given "power" level. The received power is attenuated from the effects of transmission through the channel. If the attenuation is large enough, the received bit will be decoded in error. However, the channel decoder uses soft-input Viterbi decoding, which exploits the strength of the received bits to determine what was actually sent. This gives an increase in performance compared to hard-decision Viterbi decoding, which decides on an individual bit basis if the received bit is a 0 or a 1 before any channel decoding is performed.

The approximate BERs and carrier to interference ratios of the GSM channel simulator, which were used in these experiments, are shown in Table 3:

TABLE 3

GSM channel conditions.

| BER | C/I (dB) |
|---|---|
| 0.3% | 19 |
| 0.7% | 16 |
| 1.8% | 13 |
| 3.8% | 10 |
| 7.3% | 7 |
| 12.1% | 4 |

Each FEC coded bitstream was subjected to the 6 channel conditions listed in Table 3 in 10 different trials. For each of these trials, the first frame was transmitted without corruption. The rest of the bitstream was corrupted by a different set of errors with the same BER for each trial to produce different corrupted bitstreams with approximately the same number of errors. The corrupted bitstreams were channel decoded and the corrected bitstreams were source decoded to find the quality of the reconstructed video. The PSNR metric was used to get a quantitative measurement of the video quality, and the PSNR was averaged over all 10 trials at a given channel condition to obtain the average PSNR for a sequence using a given channel coding rate. Thus, for each source coding option, there are 5 channel coding rates; for each channel coding rate, there are 4 video sequences to be coded; for each FEC coded sequence, there are 6 error rates to be tested; and for each error rate, there are 10 trials performed. All of this data was compiled to compare the different channel coding techniques as well as the effects of using the different MPEG-4 error resilience tools.

Figure 6:
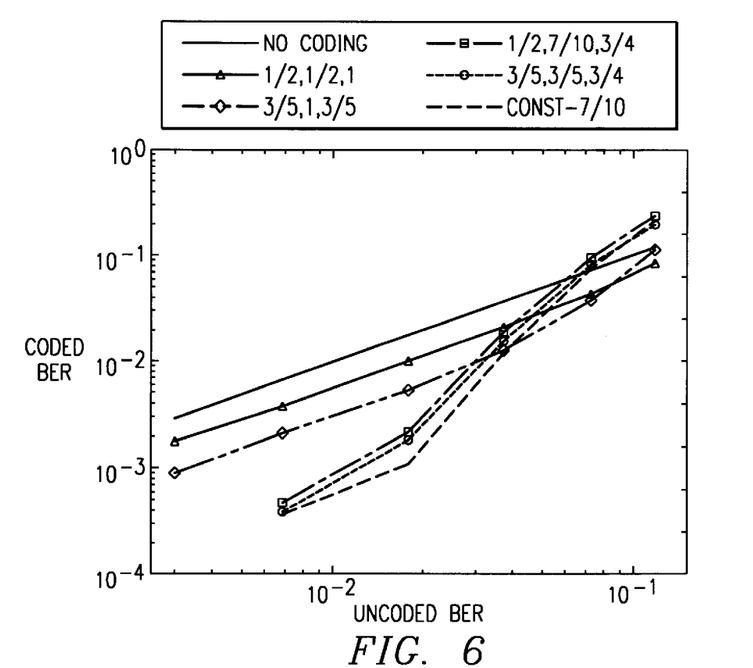
FIGS. 6–11 are experimental results.

In order to compare the different methods of adding channel coding to the compressed video, the results from the 10 trials at a given error rate were averaged for all four sequences at a given method of source compression. This gives 40 trials (10 trials per sequence) at each channel error rate for a given channel protection rate. FIG. 6 shows the average BER that remains after channel decoding for each of the GSM channel BER conditions. Channel coding substantially reduces the effective BER seen by the decoder for most of the raw channel conditions. However, the convolutional codes break down when the error rate is too high. Thus for the GSM channels which have a BER around 10%, the channel coding actually increases the effective BER seen by the decoder. Under such harsh conditions, the channel coder would need to use more powerful codes to reduce the BER. However, for the remainder of the GSM channel conditions, the FEC codes reduce the effective BER by over an order of magnitude. This brings the number of bit errors remaining in the bitstream that is sent to the MPEG-4 decoder to a level at which the error resilience tools can work.

Figure 7:
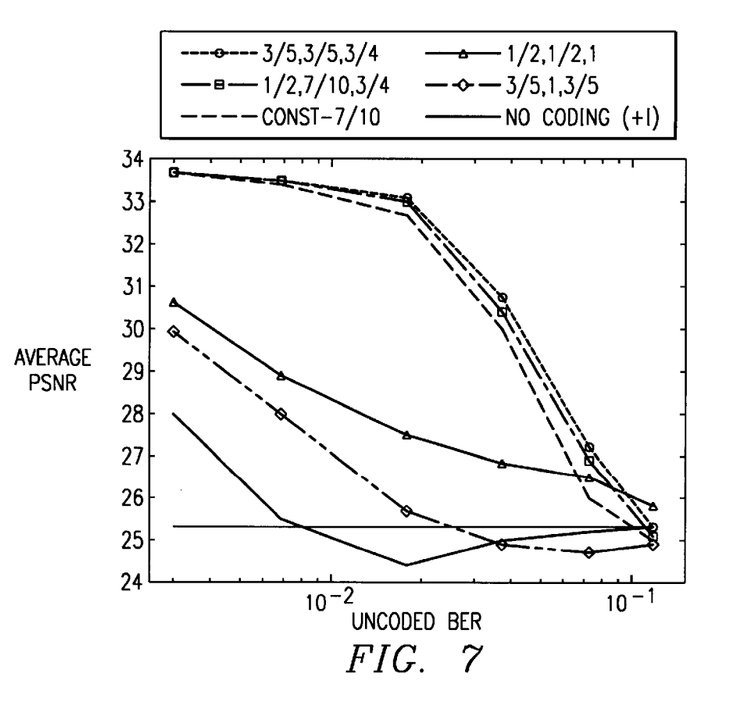
Figure 8:
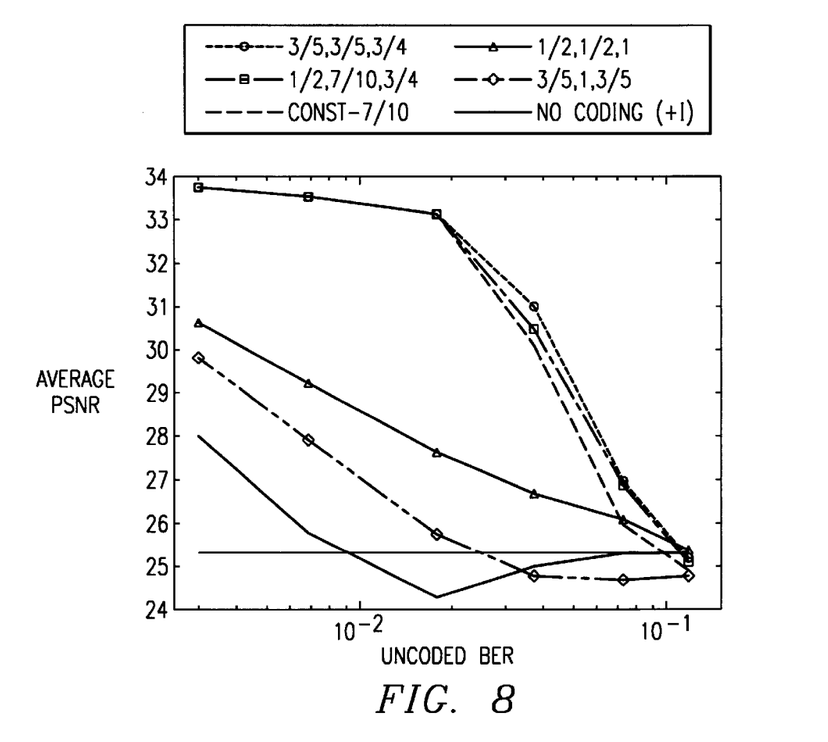

FIGS. 7 and 8 show a comparison of the average PSNR values obtained by the different channel coding methods when the sequences are compressed using data partitioning and reversible variable length coding. These plots show that unequal error protection (UEP) produces the highest average PSNR for the reconstructed video. Since all of the coding methods shown in FIGS. 7 and 8 require 50% FEC overhead, this improvement (as much as 1 dB compared with fixed channel coding) does not require additional bandwidth and essentially comes for free. In addition, it is interesting to note that for some error conditions, the fixed rate-7/10 coder produces the fewest errors in the channel decoded bitstream, yet it still produces lower quality reconstructed video. This is because the errors are spread evenly throughout the different portions of the video packet.

Conversely, the unequal error protection coders have more errors in the channel decoded bitstream, but these errors are in less important portions of the video packet. This once again shows the advantage of using UEP combined with knowledge of the structure of the video packet.

FIGS. 7 and 8 also show the importance of channel coding on all portions of the video packet for the channel error rates tested in these experiments. If any portion of the video packet is not coded (i.e., rate-1), the reconstructed quality is very low. If the header (Section 1) is not protected, a large number of the packets will be undecodable and hence lost data. If the motion information (Section 2) is not protected, the macroblock information will be dropped. The highest quality is achieved by not protecting the texture data (Section 3) because this is the least important section of the video packet. However, if the texture data from a large number of video packets is lost, the reconstructed quality will not be acceptable. Thus all the information in the video packet must be protected with some level of FEC coding when the raw channel error rates are high.

Rather than using the 50% overhead bits for channel coding, it might be beneficial to spend these bits on forced intra-MB updates. These intra-MBs would stop error propagation and hence improve reconstructed video quality. In order to test the effectiveness of using I-MBs, the video sequences were compressed with 6 forced I-MBs per frame, which gives approximately 50% overhead at the source bitrates used in the experiments. The average PSNR for this case for each of the channel error conditions is shown in FIGS. 7 and 8 (labeled as no_coding +I). As is shown in these figures, it is much better to use the overhead for channel coding than adding I-MBs into the frame at these high channel error rates, since the quality of the video improves substantially by using this overhead for channel coding. As the channel error rates decrease below the levels tested here, it would probably be advantageous to reduce the number of bits spent on channel coding and increase the number of forced I-MBs per frame to get the optimal reconstructed video quality.

The horizontal line at approximately 25.3 dB in FIGS. 7 and 8 represents the average PSNR if all frames after the initial intra frame were dropped. When the channel error rate is extremely high (above $10^{-1}$ BER), the reconstructed video is so degraded that it would be better (in a PSNR sense) to not send any information and display the intra frame for the entire 10 seconds. When the channel is very bad, it makes more sense to drop the temporal frame rate than to try to get any information across such a highly degraded channel. Thus there is a tradeoff between not only source and channel coding but also frame rate. A system that adapted all of these parameters based on the current channel conditions would produce the optimal reconstructed video.

Figure 9:
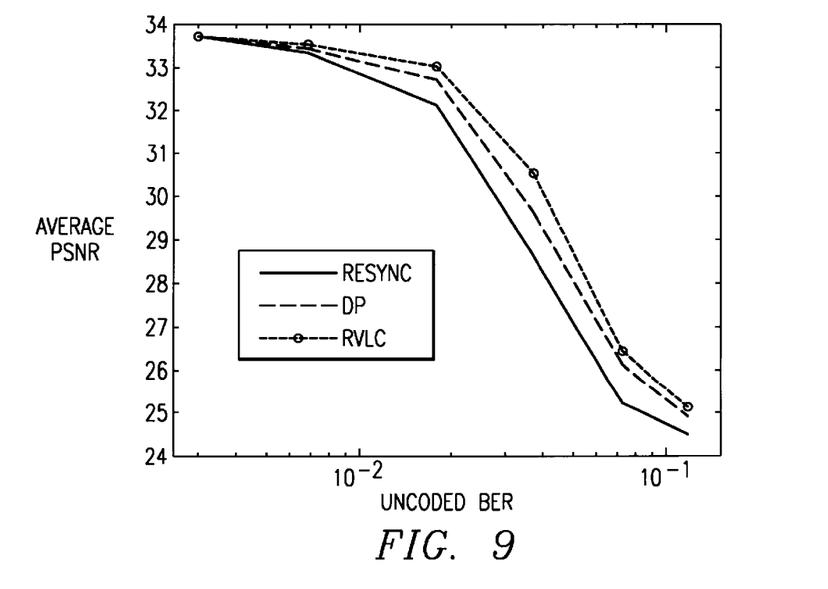
Figure 10:
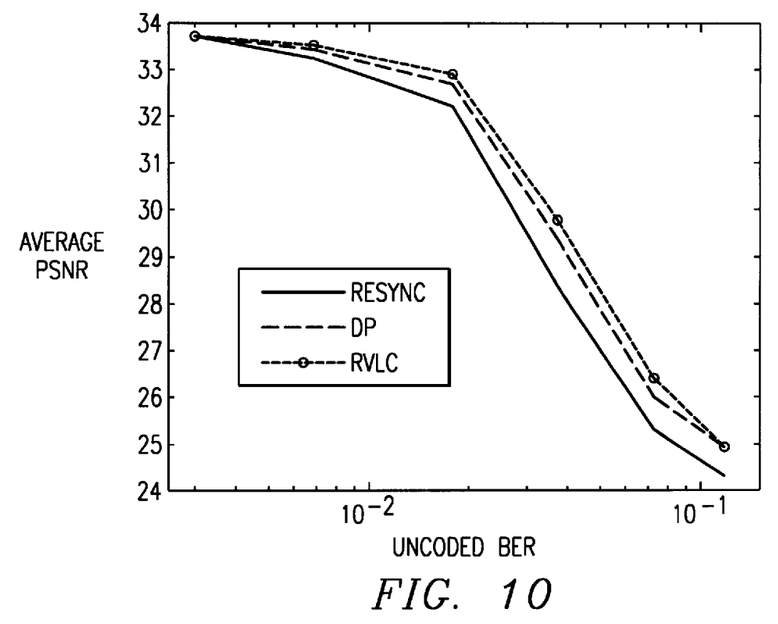
Figure 11:
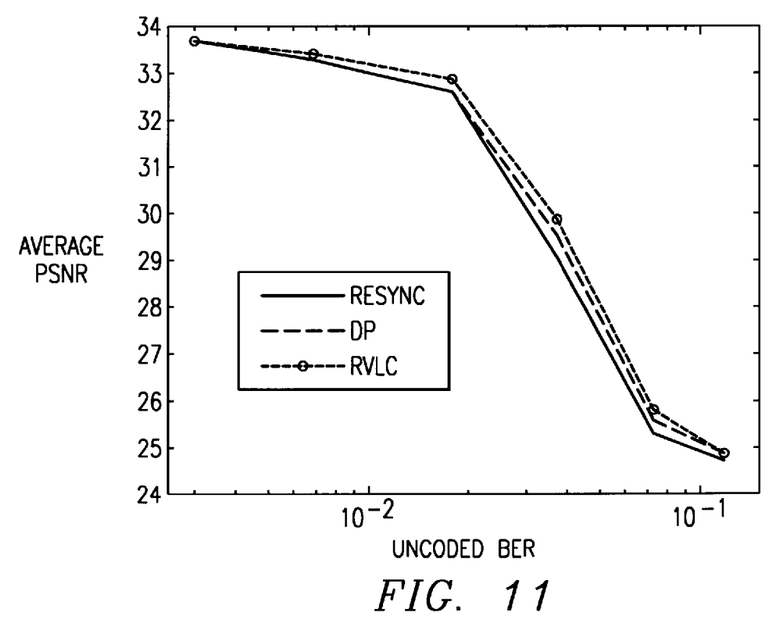

The data from these experiments can also be used to determine the effectiveness of the different MPEG-4 error resilience tools when compressed bitstreams are transmitted across "real" channels. FIGS. 9–11 show a comparison of the different source encoding methods for the different channel error rates using both unequal error protection and fixed-rate channel coders. FIGS. 9 and 10, the results for unequal error protection channel coders, show that using RVLCs in addition to data partitioning and resynchronization markers gives between 0.5 and 2 dB improvement in PSNR compared with only using resynchronization markers. This increase in PSNR is especially important for the GSM channel BER of 3.8%. At this channel condition, using RVLCs and data partitioning raise the quality of the reconstructed video from a level which would probably not be acceptable (average PSNR=28.5 dB for only resynchronization markers) to a much higher quality signal (average PSNR=30.5 dB for RVLC, data partitioning, and resynchronization markers).

The improvements from using RVLCs and data partitioning are smaller when the bitstream is channel coded with a fixed rate coder (FIG. 11) rather than using unequal error protection. However, there is still between 0.5 and 1 dB improvement from using RVLCs and data partitioning. The reason these gains are smaller than in the unequal error protection case is that a fixed channel coder does not exploit the structure of the data partitioned bitstream. Thus errors in the channel-decoded bitstream are spread evenly throughout the video packet. If the motion part of the video packet is corrupted, there is no advantage to using data partitioning. Similarly, if the stuffing bits are not protected well, the decoder will be unable to perform reverse decoding and there is no advantage to using RVLCs. However, there is a large gain in reconstructed video quality if the stuffing bits are not corrupted and RVLCs can be used and if the motion is not corrupted and motion compensation can be performed. Thus there are improvements and it is worth using data partitioning and RVLCs, even if the channel coder is a fixed rate coder.

The results of these experiments have shown the advantage of using unequal error protection for protecting MPEG-4 simple encoded video data. By exploiting the structure of the source coded bitstream, unequal error protection is able to obtain the highest quality reconstructed video for a given source rate and fixed overhead after transmission through a highly error-prone wireless channel. These experiments have also shown the advantage of using reversible variable length codes and data partitioning when transmitting video over wireless channels. The gains from using these error resilience tools are especially important at the higher bit error rates, where utilizing these tools can raise the quality level of reconstructed video to a much more acceptable level than if they were not incorporated into the compressed bitstream. It has been shown that a video system which trades-off source and channel coding and incorporates error resilience tools into the source coding can produce high quality reconstructed video after transmission through a wireless channel.

Modifications to DMIF to Support Preferred Embodiments

Support for unequal error protection requires modifications to MPEG-4 DMIF. We first describe the packetization scheme used in MPEG-4 to transport compressed media streams. Compressed media streams are also referred to as Elementary Streams (ES).

Figure 12:
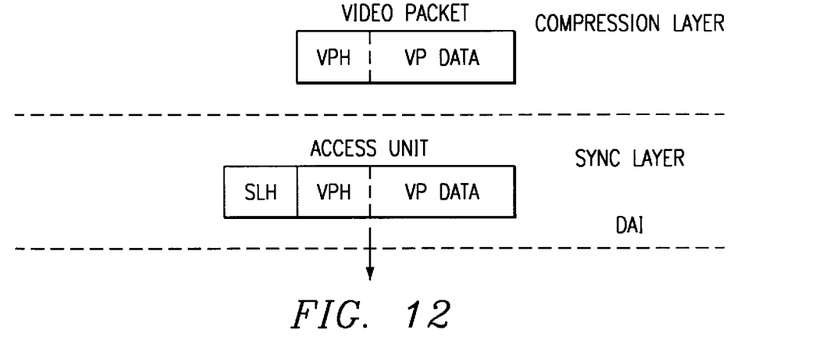
FIGS. 12–14 illustrate adaption to DMIF.

FIG. 12 shows the way in which elementary streams (compressed media —in this case video data) are packetized in MPEG-4. Packets of compressed data are transferred from the Compression layer to the Sync layer. The Sync layer is responsible for maintaining synchronization between various elementary streams and adds on the Sync layer packet header (SLH) to the data packet obtained from the compression layer. The SL packet header provides means for continuity checking in case of data loss and carries the coded representation of the time stamps and associated information. The SL packetized unit of elementary stream data is called an access unit (AU). AUs are the data units that are finally transmitted. FIG. 12 shows the case where a single video packet is transmitted in an AU. VPH refers to the video packet header and VP data refers to the motion and DCT information H.223 is the multiplex part of the H.324 standard and is responsible for error protection and multiplexing of various media streams before transmission on the channel/network.

Figure 13:
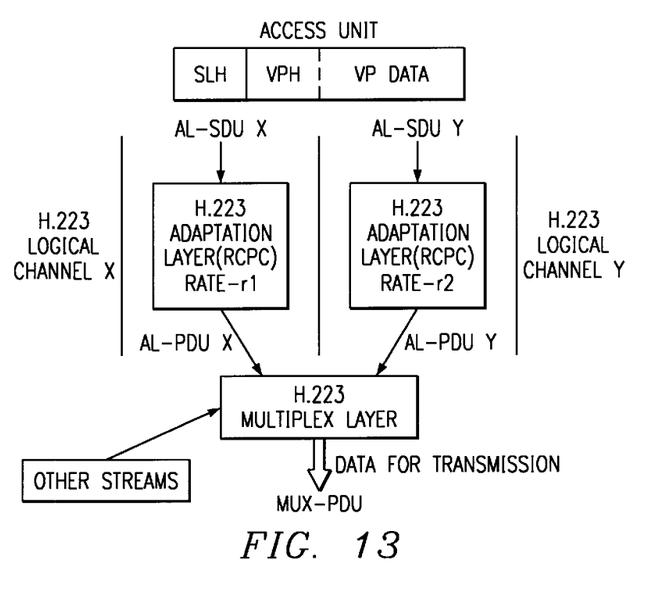

To use the H.223 standard for providing error protection, the MPEG-4 AU is split into sections and the sections are error protected to varying degrees using the rate compatible punctured convolutional (RCPC) codes of the H.223 adaptation layer. FIG. 13 shows the AU being split into two partitions.

- H.223 does not allow unequal error protection within a data unit. Thus the AU has to be split into partitions and each partition has to be transported on a different H.223 logical channel. This implies opening of multiple H.223 channels to transmit a single MPEG-4 video stream.
- To maintain data integrity of the AU, it is desired that the AL-PDUs resulting from the multiple H.223 channels used to transmit the video packet be multiplexed into the same MUX-PDU.
- The channels have to be opened to be non-segmentable. This implies that the AU is split into AL-SDU's before being passed on to H.223.

Figure 14:
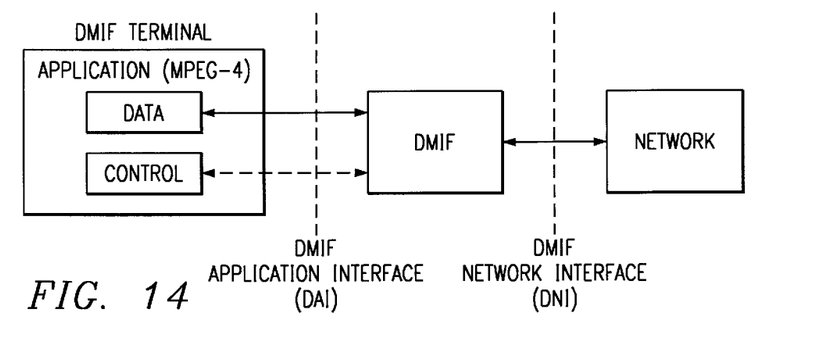

FIG. 14 shows the position of DMIF in a network application. There are two interfaces:

DMIF application interface (DAI)
DMIF network interface (DNI)

The main aim of DMIF is to keep the delivery (channel) details away from MPEG-4 applications. DNI abstracts the signaling between DMIF peers irrespectively of the supported delivery technologies. Both DAI and DNI are defined in terms of primitives which perform the functionalities required to support the interface There would be no extensions to DAI primitives.

Currently there is no way that the MPEG-4 application can tell DMIF (i.e. through DAI) that it might be advantageous to use UEP on the AU. A fix for this would be to include the following tag which specifies the use of UEP in the QoS_Descriptor. The DMIF philosophy apparently does not allow exact parameters relevant to the channel (e.g., in our case it can be the specification of the RCPC coding rates to be used in H.223 adaptation layer) to be specified at the DAI. Everything is kept general in QoS_Descriptor and based on the network used, the resources required have to be inferred from the QoS_Descriptor.

| Qos_QualifierTag | Value | Type | Description |
| --- | --- | --- | --- |
| UEP_USE | | Boolean | Recommend use unequal error protection while transmitting an AU. |

In the current DMIF, a single elementary stream is carried on a single channel. For supporting the H.223 scheme outlined above, mechanisms for allowing a single elementary stream to be carried on multiple channels should be introduced. This could be done by introducing new primitives to DNI:

DN_DownstreamChannelBlockAdd(IN: networkSessionId, serviceId, CAT, senderAddress, receiverAddress, qosDescriptor, ddDataIn( ); OUT: response, TATlist, ddDataOut( ))
DN_UpstreamChannelBlockAdd(IN: networkSessionId, serviceId, CAT, TATlist, ddDataIn; OUT: response, ddDataOut( ))
DN_DownstreamChannelBlockAdd( ) adds a downstream channel. networkSessionId and serviceId identify the network session and the service session respectively. CAT is the channel association tag which provides the connection between the elementary stream and the logical channel used to transport it. TATlist gives the list of transmux (H.223) channels to be used for the channel referred to by CAT.
DN_UpstreamChannelBlockAdd( ) adds a upstream channel. The parameter definitions used are the same as that for DN_DownstreamChannelBlockAdd( ).

Note that the names of the above functions can change based on the changes incorporated in the version 1 DMIF which is currently under standardization.

Modifications

The preferred embodiments can be modified in many ways while retaining the feature of unequal error protection of compressed video with the highest error protection for the header and stuffer and the lowest for the texture data.

For example, the punctured convolution codes used could be varied and other channel codes could be used, such as two or more unrelated convolution codes, block codes, hybrids of block and convolution codes, and so forth. And object shape information can constitute a fourth level of error protection bewteen the header information and motion data. Adjacent levels of protection can be equal provided the highest and lowest levels differ.

What is claimed is:

1. A method of coding data partitioned video information, comprising the steps of:
    (a) encoding data partitioned video information into packets with a first error protection code for a first part of said information and with a second error protection code for a second part of said information;
    (b) wherein said first error protection code provides higher error protection than said second error protection code, and said first part has a fixed size for all packets and has no texture data and said second part has variable size and has texture information.
2. The method of claim 1, wherein:
    (a) said video information has said first part of 60 bits for all packets and a third part between said first part and said second part, said third part of 155 bits for all packets.
3. A method of decoding data partitioned video information, comprising the steps of:
    (a) decoding packets of data partitioned video information with a first error protection code for a first part of said information of a fixed size for all packets and with a second error protection code for a second part of said information of a variable size for packets;
    (b) wherein said first error protection code provides higher error protection than said second error protection code, and said first part has no texture data and said second part has texture information.
4. The method of claim 3, wherein:
    (a) said video information has said first part of 60 bits for all packets and a third part between said first part and said second part, said third part of 155 bits for all packets.
5. The method of claim 1, further comprising:
    (a) said video information has a third part between said first part and said second part, said third part of a fixed size for all packets; and
    (b) encoding said third part with a third error protection code where said third error protection code provides higher error protection than said second error protection code and lower error protection than said first error protection code.

6. The method of claim 1, further comprising:
(a) said video information has a third part between said first part and said second part, said third part of a fixed size for all packets;
(b) said video information has a fourth part after said second part, said fourth part of a fixed size for all packets; and
(c) encoding said fourth part with said first error protection code.

7. The method of claim 3, further comprising:
(a) said video information has a third part between said first part and said second part, said third part of a fixed size for all packets; and
(b) decoding said third part with a third error protection code where said third error protection code provides higher error protection than said second error protection code and lower error protection than said first error protection code.

8. The method of claim 3, further comprising:
(a) said video information has a third part between said first part and said second part, said third part of a fixed size for all packets;
(b) said video information has a fourth part after said second part, said fourth part of a fixed size for all packets; and
(c) decoding said fourth part with said first error protection code.

* * * * *